US011927194B2

(12) United States Patent
Botkin et al.

(10) Patent No.: US 11,927,194 B2
(45) Date of Patent: Mar. 12, 2024

(54) CEILING FAN AND MOUNTING ASSEMBLY FOR CEILING FAN

(71) Applicant: Hunter Fan Company, Memphis, TN (US)

(72) Inventors: Charles William Botkin, Cordova, TN (US); Bobby Neal Norwood, Oakland, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 18/304,010

(22) Filed: Apr. 20, 2023

(65) Prior Publication Data

US 2023/0250827 A1 Aug. 10, 2023

Related U.S. Application Data

(63) Continuation of application No. 17/498,471, filed on Oct. 11, 2021, now Pat. No. 11,725,666.

(51) Int. Cl.
*F04D 25/08* (2006.01)
*F04D 29/64* (2006.01)

(52) U.S. Cl.
CPC ......... *F04D 25/088* (2013.01); *F04D 29/646* (2013.01); *F05B 2240/91* (2013.01)

(58) Field of Classification Search
CPC .. F04D 25/088; F04D 29/646; F05B 2240/91; F16B 39/284
See application file for complete search history.

(56) References Cited

U.S. PATENT DOCUMENTS 4,468,557 A * 8/1984 Bylin ...................... H05B 3/36 219/535
4,511,310 A 4/1985 Pearce
5,613,832 A 3/1997 Su
5,944,487 A 8/1999 Pearce
6,324,731 B1 12/2001 Pliml, Jr.
RE38,709 E * 3/2005 Gutgsell ............. H02G 3/0437 108/50.02
9,394,919 B1 7/2016 Byrne
11,499,689 B1 * 11/2022 Munoz Ledo Espinosa ............... B60Q 1/2607
2015/0164184 A1 6/2015 Morris

FOREIGN PATENT DOCUMENTS

JP H0559000 U 8/1993

* cited by examiner

*Primary Examiner* — Justin D Seabe
*Assistant Examiner* — John S Hunter, Jr.
(74) *Attorney, Agent, or Firm* — McGarry Bair PC

(57) ABSTRACT

Ceiling fans typically include a motor including a rotor and a stator, blades, a downrod, and a mounting assembly for suspending the fan from a structure. The mounting assembly includes fasteners and brackets to secure the ceiling fan to the structure. The bracket receiving the downrod is fastened to a plate that is secured to the ceiling.

17 Claims, 6 Drawing Sheets

CEILING FAN AND MOUNTING ASSEMBLY FOR CEILING FAN

CROSS-REFERENCE TO RELATED APPLICATION

This application is a continuation application of U.S. patent application Ser. No. 17/498,471, filed Oct. 11, 2021, now allowed, which is hereby incorporated herein by reference in its entirety.

BACKGROUND

Ceiling fans typically include a motor including a rotor and a stator, blades, a downrod, and a mounting assembly for suspending the fan from a structure, such as a ceiling. The mounting assembly includes fasteners and brackets to secure the ceiling fan to the structure. For example, a bracket receiving the downrod is fastened to a bracket that is secured to the ceiling.

BRIEF DESCRIPTION

In one aspect, the disclosure relates to a mounting assembly for mounting a ceiling fan assembly to a mount surface, the mounting assembly comprising: a plate configured to be mounted to the mount surface; a hanger bracket; and a set of elastomeric grommets coupling the plate to the bracket.

DETAILED DESCRIPTION

Figure 1:
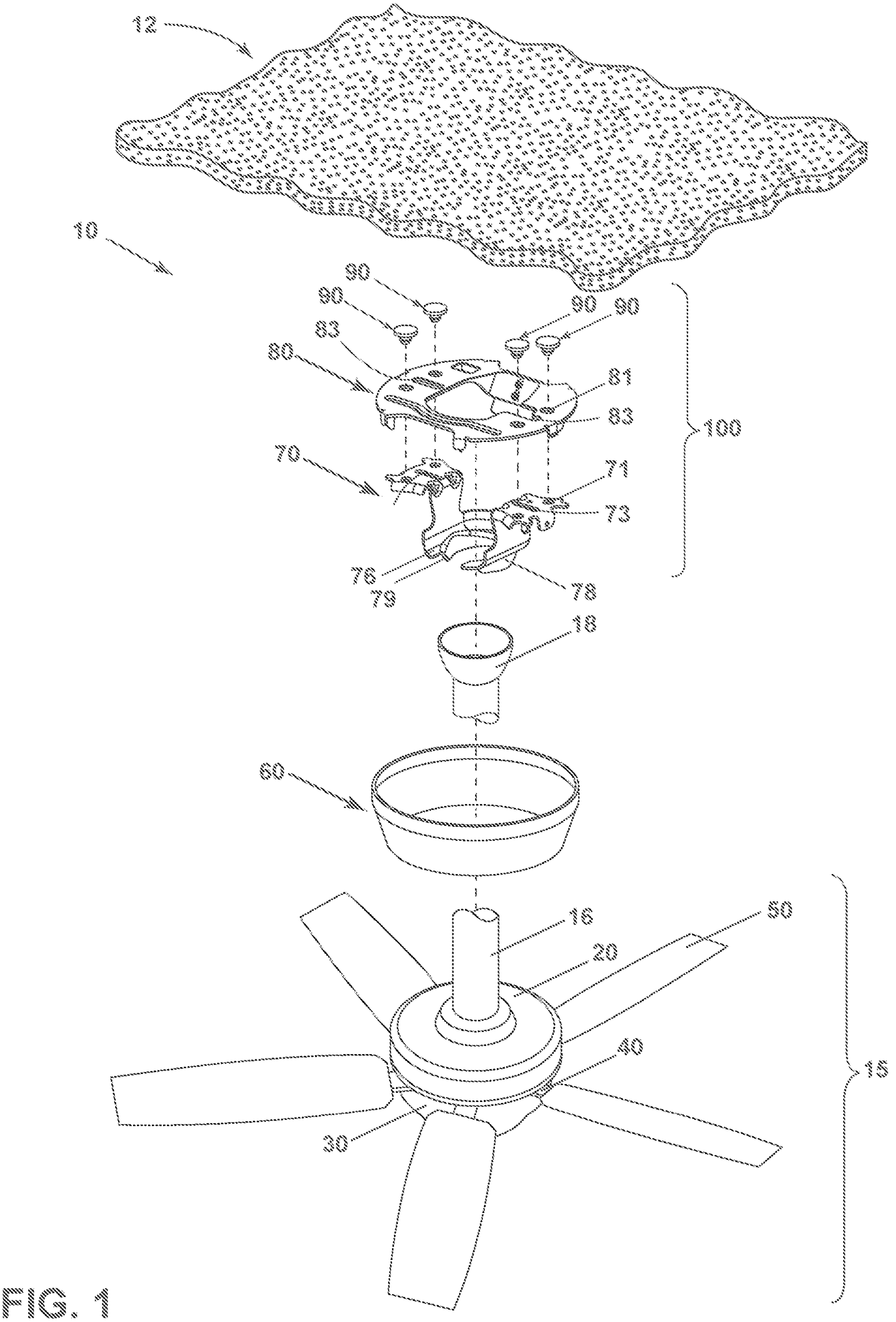
FIG. 1 is an exploded view of a ceiling fan with a mounting assembly having a mounting plate and a hanger bracket.

The disclosure is related to a ceiling fan mounting assembly, which can be used, for example, in residential, agricultural, industrial, and commercial applications. More specifically, this disclosure relates to a ceiling fan mounting assembly utilizing an elastomeric grommet to both reduce vibration noise and hold together a ceiling plate and a hanger bracket. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

All directional references (e.g., proximal, distal, upper, lower, upward, downward, left, right, lateral, front, back, top, bottom, above, below, vertical, horizontal, clockwise, counterclockwise, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a ceiling fan assembly 10 is shown. In non-limiting examples, the ceiling fan assembly 10 can include a ceiling fan 15, a downrod 16, a canopy 60, and a mounting assembly 100. The mounting assembly 100 is secured to a structure 12, and the ceiling fan 15 is secured by the downrod 16 to the mounting assembly 100. The canopy 60 provides a decorative cover for the mounting assembly 100.

The ceiling fan 15 further includes a motor housing 20 at least partially encases a motor (not shown) having a rotor and a stator (not shown). Additional components of the ceiling fan include a light kit 30, a set of blade irons 40, and a set of blades 50. In additional non-limiting examples, the ceiling fan assembly 10 can include one or more of a controller, a wireless receiver, a light glass, a light cage, a spindle, a finial, a switch housing, blade forks, blade tips or blade caps, or other ceiling fan components.

At least one fan blade 50 can be carried by the rotor. For example, the at least one fan blade 50 can extend radially from the ceiling fan assembly 10, and can be rotatable to drive a volume of fluid such as air. That is, the at least one fan blade 50 can be operably coupled to the motor at the rotor, such as via the blade irons 40. The at least one fan blade 50 can include a set of blades 50, having any number of blades, including only one blade.

The structure 12 can be a ceiling, for example, from which the ceiling fan assembly 10 is suspended. It should be understood that the structure 12 can include any suitable building, structure, home, business, or other environment wherein moving air with a ceiling fan is suitable or desirable. The structure 12 can also include an electrical supply (not shown) and can electrically couple to the ceiling fan assembly 10 to provide electrical power to the ceiling fan assembly 10 and motor. It is also contemplated that the electrical supply be sourced from somewhere other than the structure 12, such as a battery or generator in non-limiting examples.

The canopy 60 can couple to the ceiling fan mounting assembly 100. The canopy 60 can be a decorative cover to encase or conceal at least a portion of the mounting assembly 100. The canopy 60 can slidably receive the downrod 16. When positioned, the canopy 60 can circumscribe the mounting assembly 100 and can fasten to at least the mounting plate 80 or the hanger bracket 70. The canopy 60 can secure to the mounting assembly 100 by any reasonable means.

The mounting plate 80 and hanger bracket 70 are secured to the structure 12, typically by suitable fasteners, such as screws, passing through openings 73, 83 respectively in the hanger bracket 70 and mounting plate 80 and into the structure 12. The openings 83 can be holes, sized for the anticipated fasteners, and/or slots, which let the installer slide the mounting plate relative to an already installed fastener and/or allow flexibility in the location of the fastener along the slot. The mounting plate 80 is generally located at an electrical junction box in the structure 12, so that electrical wires in the junction box are accessible through the mounting plate 80.

The hanger bracket 70 can include a seat 76, optionally formed in a collar 78, which receives the hanger ball 18. The receipt of the hanger ball 18 in the seat 76 permits the hanger ball 18 to move within the seat 76 in response to movement of the downrod 16 caused by movement of the ceiling fan, such as in response to a rotational out of balance condition of the ceiling fan or an impact force on the fan. The collar 78 can receive the hanger ball 18 via a side opening 79 to locate the hanger ball 18 within the seat 76.

Traditionally, the hanger bracket 70 was secured to the mounting plate 80 by the same fasteners used to secure the mounting plate 80 to the structure 12. However, this has proven cumbersome and difficult for some consumers to install since the consumer should somehow hold and position, typically simultaneously, both the mounting plate 80 and the hanger bracket 70 as they install the fasteners. To address this problem, a set of elastomeric grommets 90 secures the hanger bracket 70 to the mounting plate 80, such that hanger bracket 70 and the mounting plate 80 may be more easily handled together and function as a single unit. The set of grommets 90 can be arranged such that the hanger bracket 70 and mounting plate are aligned as desired in addition to being held together as a unit. To effect this coupling, the elastomeric grommets 90 are passed through corresponding sets of plate apertures 81 and bracket apertures 71.

Figure 2:
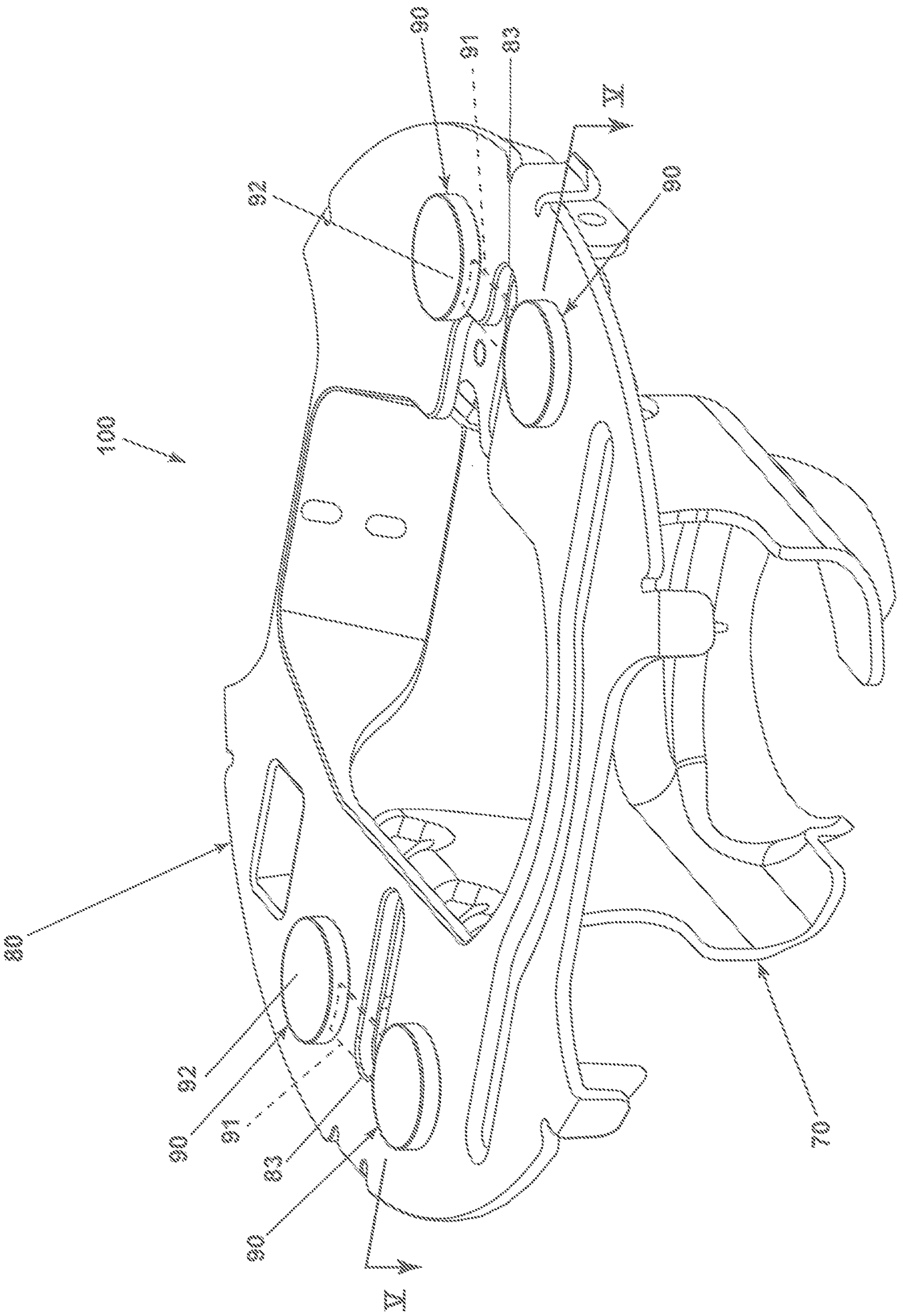
FIG. 2 is a top perspective view of the ceiling fan mounting plate fastened to the hanger bracket with grommets.

The mounting assembly 100 is shown in FIG. 2 in an assembled configuration where the hanger bracket 70 and mounting plate 80 are held together by the set of grommets 90. The set of grommets 90 may be spaced from one another about the mounting plate 80 in any desired arrangement. As shown, the grommets 90 are located in pairs on opposite sides of a central opening through which electrical wires from the structure and/or fan may pass. Other arrangements are contemplated, such as equal, radial spacing out the central opening. Variable arrangements and spacing distributions of the grommets 90 are contemplated. The set of grommets 90 can include fewer or more grommets 90 than those shown in the illustrated example in FIG. 2. While four grommets are shown, there can be more or less than four, and there can be either an even or odd number of grommets.

A top portion or spacer 92 of each of the set of grommets 90 overlies a portion of the mounting plate 80 around the aperture 81. Optionally, two or more grommets of the set of grommets 90 may be coupled together by a bridge portion 91 such that there is one spacer 92 that bridges the region between and above two plate apertures 81. The bridge portion 91 can be coupled to or unitarily formed with the grommets 90.

Figure 3:
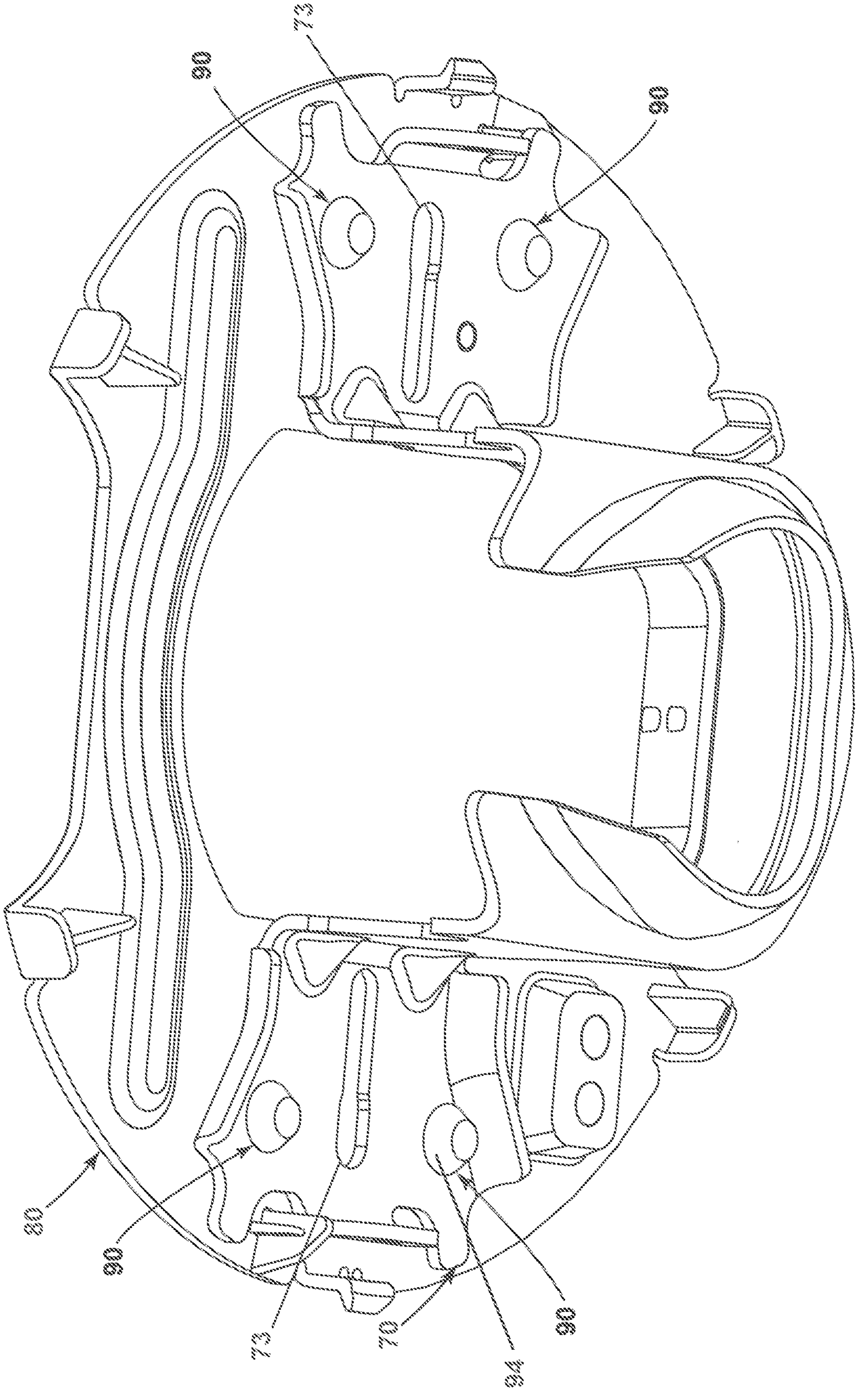
FIG. 3 is a bottom perspective view of the mounting assembly of FIG. 2.

FIG. 3 shows an underside of the mounting assembly 100 in an assembled configuration including the set of grommets 90 where an end portion or cap 94 of each of the set of grommets 90 emerges through and covers the bracket apertures 71 and abuts the underside of hanger bracket 70. While shown as having the same size and shape in FIGS. 2 and 3, it is contemplated that each of the set of grommets 90 may be different from one another in size and shape.

Figure 4:
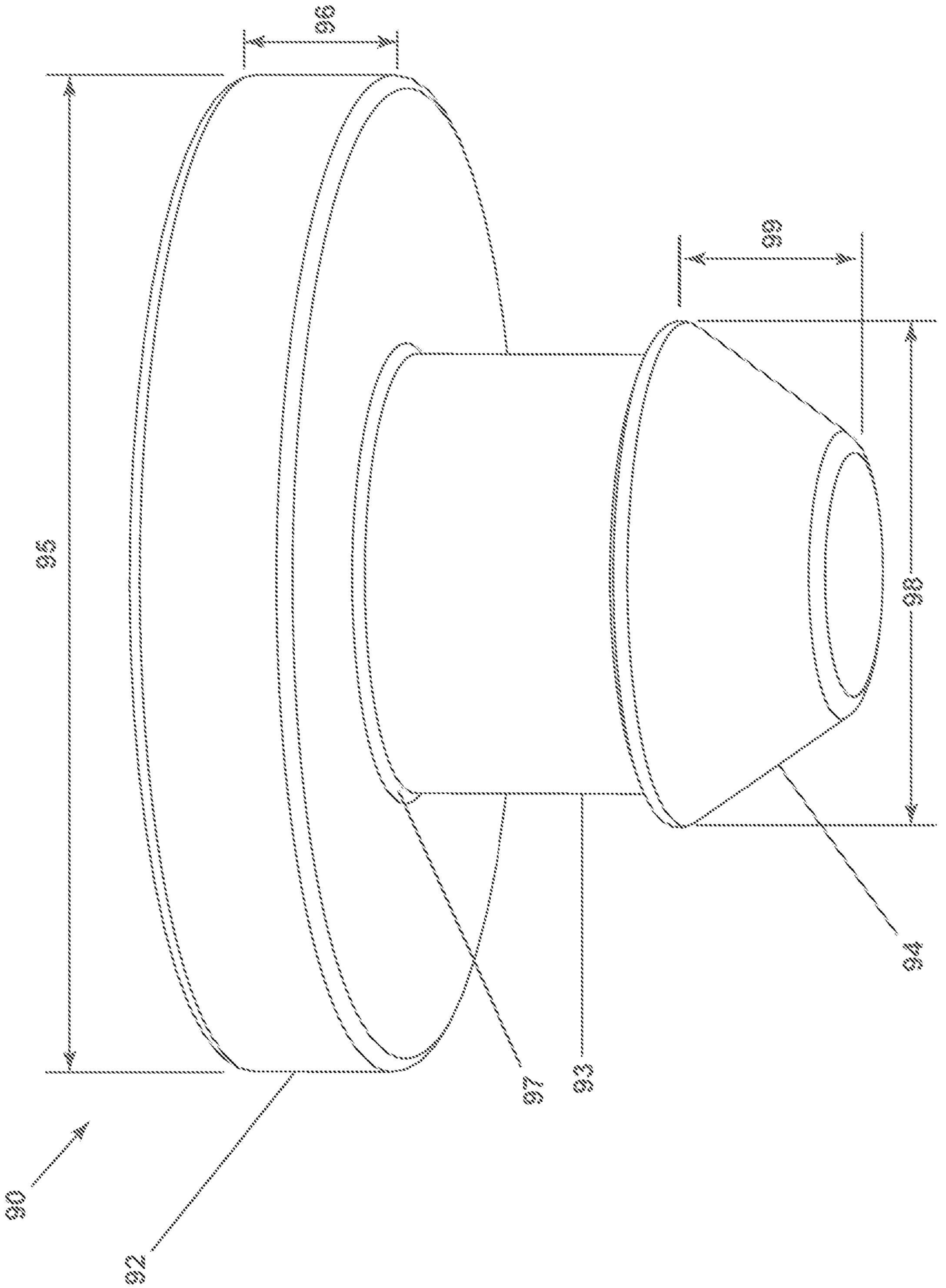
FIG. 4 is a is a bottom perspective view of the mounting assembly grommet.

Turning now to FIG. 4, an exemplary elastomeric grommet 90 is shown in detail. The grommet 90 is illustrated as having a spacer 92, from which extends a stem 93, terminating in the cap 94. The shape of spacer 92 is shown as circular, however it is contemplated that the spacer 92 can be any shape including square, rectangular, or oval. The shape and properties of the spacer 92 should be such that it cannot be pulled through the apertures 81 during installation of the mounting assembly 100 to the structure 12. The edges of spacer 92 may be chamfered as shown, or square angled, rounded or tapered. The spacer 92 has a spacer width 95 and a thickness 96. In one contemplated example, the spacer thickness 96 can range between ⅛" (3 mm) to ½" (13 mm). The spacer width 95, thickness 96, and shape of spacer 92 primarily affect the nature of the contact between the mounting assembly 100 and the structure 12 and are therefore important for the sound reducing properties of the set of grommets 90.

The stem 93 may be cylindrical or may have a tapered, curved, or other non-linear shape. The surface of stem 93 may be smooth as shown, or may include ridges to help provide friction for a tight fit within the bracket apertures 71. The junction of the spacer 92 with stem 93 may include a fillet 97 that supports the stem. In one contemplated example, the length of the stem 93 can be 1/16" (2 mm) to ⅜" (9 mm).

The cap 94 is to be inserted through the apertures 81 and 71 to make easy the securing of the mounting plate 80 and hanger bracket 70 with the grommet 90. The cap 94 can be shaped and/or made from material such that the cap 94 is larger than at least one of the apertures 81, 71, and such that the cap 94 can be deformed or change shape to pass through at least one of the apertures 81, 71, and then return to a shape where it resists being withdrawn through at least one of the apertures 81, 71. One possible shape for the cap 94 is tapered. While illustrated as a frustoconical shape, other shapes for the cap 94 may be contemplated such as rounded or faceted. The edges of cap 94 may be chamfered as shown, or rounded, square angled. The junction of the cap 94 with stem 93 may include a fillet 97 (not shown) for strengthening the junction. In one contemplated example, the thickness 99 of the cap 94 can be ⅛" (3 mm) to ¾" (6 mm).

Figure 6:
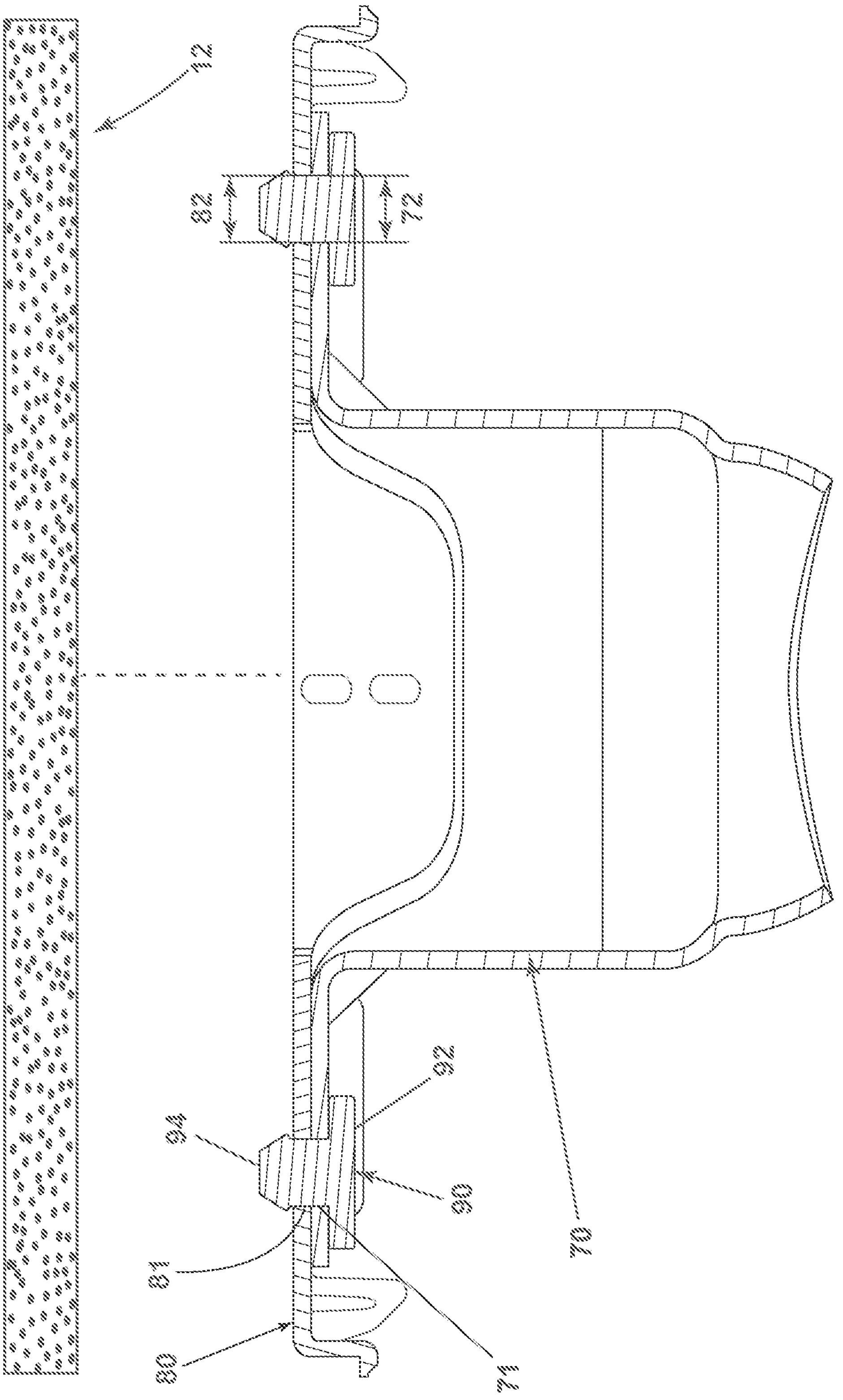
FIG. 6 is identical to FIG. 5 and illustrates an alternative orientation for the elastomeric grommets.

The set of grommets 90 may be inserted through apertures 71, 81 either from the top down, where the cap passes first through the plate aperture 81 and then through the bracket aperture 71. Alternatively, the set of grommets 90 may be inserted from the bottom up, where the cap 94 passes first through the bracket aperture 71 and then through the plate aperture 81. (FIG. 6) In this case, the cap 94 may function as the spacer 92 between the plate 80 and the structure 12. The cap 94 only needs to be forced through the aperture that is farthest along the direction of insertion in order to confine both plate and bracket between the spacer 92 and the cap 94.

The elastomeric grommet 90 is formed from a flexible material that allows the grommet to be deformed during assembly. The grommet 90 elastomer material may include, but is not limited to, one or more of natural rubber, synthetic rubber, unsaturated carbon backbone polymers such as polyisoprene rubber, polybutadiene rubber, styrene-butadiene rubber, or polychloroprene rubber. The elastometric material may additionally or alternatively include silicone or fluorosilicone rubber, thermoplastic elastomers, viscoelastic polymers, or elastomeric alloys. The hardness of the material falls on the Shore A durometer scale at 50+/−5. By way of non-limiting example, the material composition can be a mixture of natural rubber, synthetic rubber, and unsaturated carbon backbone polymer, respectively in a 20:70:10 ratio. Alternatively, the material composition may be a mixture of natural rubber, synthetic rubber, and unsaturated carbon backbone polymer, respectively in a 30:60:10 ratio. Alternatively, the material composition may be a mixture of natural rubber, synthetic rubber, and unsaturated carbon backbone polymer, respectively in a 40:50:10 ratio. Alternatively, the material composition may be a mixture of natural rubber, synthetic rubber, and unsaturated carbon backbone polymer, respectively in a 50:40:10 ratio the material composition can be a mixture of natural rubber, synthetic rubber, and unsaturated carbon backbone polymer, respectively in a 60:30:10 ratio the material composition can be a mixture of natural rubber, synthetic rubber, and unsaturated carbon backbone polymer, respectively in a 70:20:10 ratio.

Figure 5:
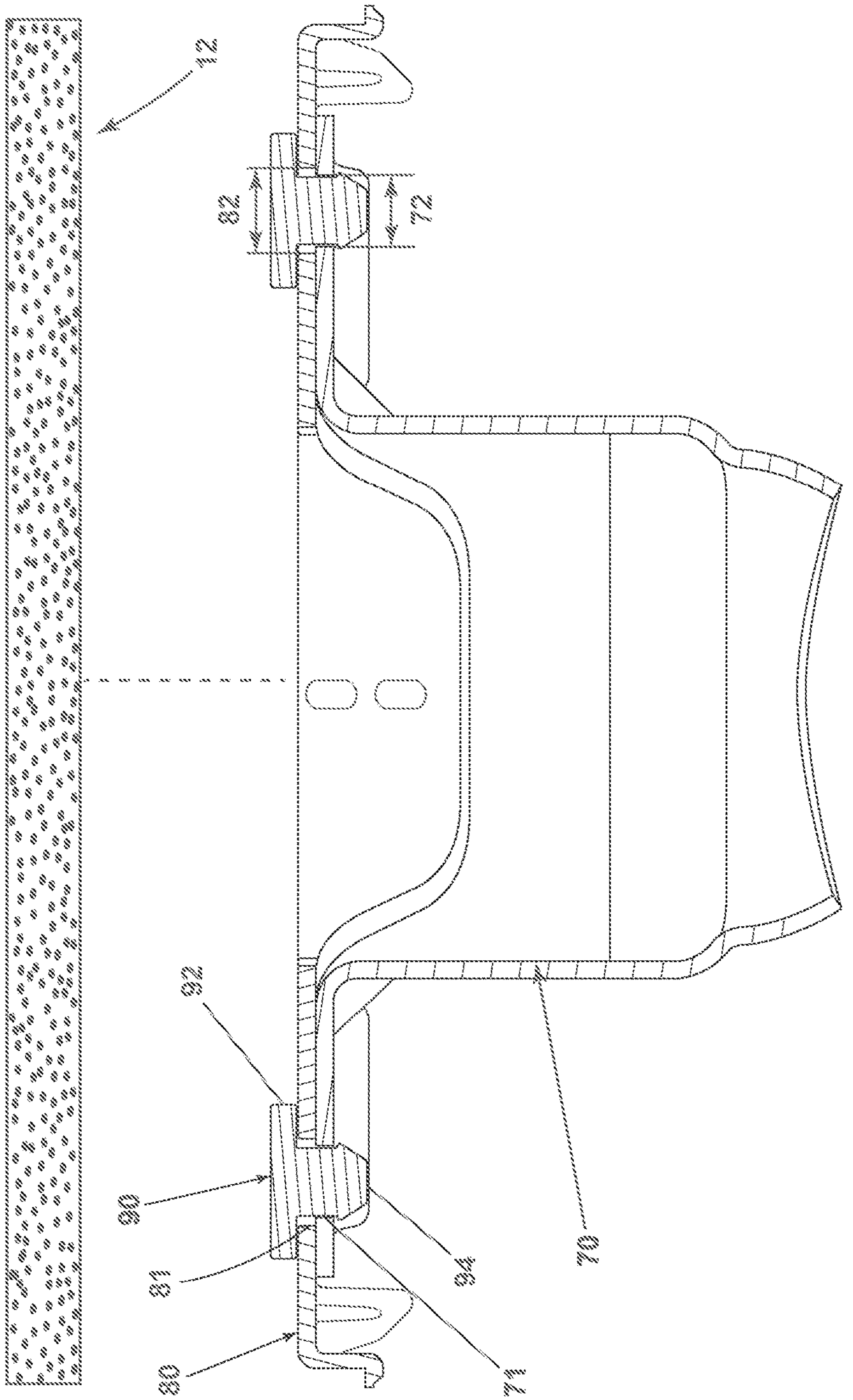
FIG. 5 is a cross-section of the mounting assembly of FIG. 2 taken across section V-V.

Referring now to FIG. 5, in the assembled configuration of mounting assembly 100, the set of plate apertures 81 and the set of bracket apertures 71 align and receive the set of grommets 90. The plate apertures 81 and the bracket apertures 71 have plate aperture width 82 and bracket aperture width 72, respectively. The bracket aperture width 72 and the plate aperture width 82 may be equal or unequal. In a non-limiting example, the plate aperture width 82 is larger than the bracket aperture width 72. Additionally, the apertures 71, 81 may be circular, oval, or irregular in shape, and need not have the same shape.

The spacer 92 confronts the top surface of the mounting plate 80 while the stem 93 is received within the apertures 71, 81 and the cap 94 confronts the bottom surface of the hanger bracket 70. The spacer width 95 is greater than both the aperture widths 72, 82. At its widest point the cap 94 has a cap width 98 that is larger than the bracket aperture width 72, The cap width 98 may be larger or about the same as the plate aperture width 82. (FIG. 6) Furthermore, the cap width 98 is such that the cap 94 can be deformed or compressed to pass through the plate apertures 81 and the bracket apertures 71, and then expand to secure the mounting plate 80 to the hanger bracket 70.

The set of grommets 90 need only be strong enough to hold the mounting plate 80 and the hanger bracket 70 together so they can be handled as a unit during the installation step of fastening them to the structure 12. It is not necessary that the set of grommets 90 support the weight of the ceiling fan assembly 10 as it is contemplated that the fastener securing the mounting plate 80 to the structure will also secure the hanger bracket 70 to the mounting plate 80. Additionally, it is contemplated that the set of grommets 90 are capable of supporting the weight of the ceiling fan assembly 10.

In operation, the spacer 92 lies above the mounting plate 80 and contacts the structure 12 when the ceiling fan assembly 10 is mounted. The rotating components of the fan can create vibrations that are transmitted through the structure and associated surfaces. Beneficially, the set of grommets 90 dampens vibrations and reduces the transmission of associated sounds from the ceiling fan assembly 10 to the structure 12. In other words, the set of grommets 90 serves as an insulator of vibration or sound between the ceiling fan assembly 10 and the building structure 12 providing the benefit of reduced noise.

Additionally, the set of grommets 90 grommet serves as an attachment fastener between the mounting plate 80 and the hanger bracket 70. A benefit derived therefrom is an improved user experience during installation as the hanger bracket and ceiling mounting plate are stably attached during a surface mounting step. Advantageously, the user can more easily handle the mounting plate 80 and hanger bracket 70 together in order to fasten the mounting assembly 100 to the structure 12. Furthermore, the set of grommets 90 fasten the mounting plate 80 to the hanger bracket 70 using fewer pieces than traditional means such as screws; an advantage is fewer pieces are required for assembly, which can reduce cost.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A mounting assembly for mounting a ceiling fan assembly to a mount surface, the mounting assembly comprising: a plate configured to be mounted to the mount surface;

a hanger bracket; a set of elastomeric grommets, coupling the plate to the bracket, wherein each of the set of elastomeric grommets comprises: a spacer, located between the plate and the mount surface, a stem extending between the plate and bracket, and at least one cap, located beneath the hanger bracket.

2. The mounting assembly of any of the preceding clauses, wherein the plate further comprises a set of plate apertures that receive at least one of the set of elastomeric grommets.

3. The mounting assembly of any of the preceding clauses, wherein the hanger bracket further comprises a set of bracket apertures that receive at least one of the set of elastomeric grommets.

4. The mounting assembly of any of the preceding clauses, wherein the plate aperture is larger than the bracket aperture.

5. The mounting assembly of any of the preceding clauses, wherein the plate aperture is oblong and the bracket aperture is circular.

6. The mounting assembly of any of the preceding clauses, wherein the stem width is about the same as the bracket aperture width.

7. The mounting assembly of any of the preceding clauses, wherein the set of elastomeric grommets comprises 2 or more elastomeric grommets.

8. The mounting assembly of any of the preceding clauses, wherein each of the set of grommets comprises a spacer and a bridge between at least two caps.

9. The mounting assembly of any of the preceding clauses, wherein the set of elastomeric grommets comprises one or more of natural rubber, synthetic rubber, neoprene, polyisoprene, polybutadiene, silicone rubber, or a viscoelastic polymer.

10. A ceiling fan assembly comprising: a ceiling fan; a downrod having one end terminating in a hanger ball and another end affixed to the ceiling fan; and a mounting plate and hanger bracket secured together by a set of elastomeric grommets, with the hanger bracket retaining the hanger ball.

11. The ceiling fan assembly of any of the preceding clauses wherein the elastomeric grommets comprise a spacer, confronting one of the mounting plate or hanger bracket, a cap confronting the other of the mounting plate or hanger bracket, and a stem extending between the spacer and the cap.

12. The ceiling fan assembly of any of the preceding clauses wherein the other of the mounting plate or hanger bracket comprises openings corresponding to the grommets, and the cap has a portion larger than at least one of the openings.

13. The ceiling fan assembly of any of the preceding clauses wherein the cap is deformable to pass through the at least one of the openings.

14. The ceiling fan assembly of any of the preceding clauses wherein the cap has a variable cross-sectional area.

15. The ceiling fan assembly of any of the preceding clauses wherein the spacer is larger than the at least one of the openings.

16. The ceiling fan assembly of any of the preceding clauses wherein the spacer confronts the mounting plate and the cap confronts the hanger bracket.

17. The ceiling fan assembly of any of the preceding clauses wherein the set of elastomeric grommets are arranged in pairs.

18. The ceiling fan assembly of any of the preceding clauses wherein at least two of the pairs are diametrically opposed.

19. The ceiling fan assembly of any of the preceding clauses wherein the mounting plate has a set of mounting plate apertures, the ceiling plate has a set of ceiling plate apertures, which are aligned with the mounting plate apertures to form pairs of aligned apertures, and at least one of the grommets passes through one of the pairs of aligned apertures.

20. The ceiling fan assembly of any of the preceding clauses wherein the spacer confronts and is larger than one of the apertures of the pair and the cap confronts and is larger than the other of the apertures in the pair.

What is claimed is:

1. A ceiling fan assembly to a mount surface, the ceiling fan assembly comprising:
- a plate configured to be mounted to the mount surface;

- a hanger bracket having a seat;
- a hanger ball seated in the seat;
- a downrod carried by the ball;
- a motor housing carried by the downrod
- a motor with a rotor located within the motor housing;
- at least one blade connected to the rotor; and
- a set of elastomeric grommets coupling the plate to the hanger bracket.

2. The ceiling fan assembly of claim 1, wherein the plate further comprises a set of plate apertures that receive at least one of the set of elastomeric grommets.

3. The ceiling fan assembly of claim 2, wherein the hanger bracket further comprises a set of bracket apertures that receive at least one of the set of elastomeric grommets.

4. The ceiling fan assembly of claim 3, wherein the plate aperture is larger than the bracket aperture.

5. The ceiling fan assembly of claim 4, wherein the plate aperture is oblong and the bracket aperture is circular.

6. The ceiling fan assembly of claim 3, wherein each of the set of grommets have a stem with a width the same or smaller as the bracket aperture width.

7. The ceiling fan assembly of claim 3, wherein the set of elastomeric grommets comprises two or more elastomeric grommets.

8. The ceiling fan assembly of claim 7, wherein each of the set of grommets comprises a cap and a bridge between at least two of the caps.

9. The ceiling fan assembly of claim 1, wherein the set of elastomeric grommets comprises one or more of natural rubber, synthetic rubber, neoprene, polyisoprene, polybutadiene, silicone rubber, or a viscoelastic polymer.

10. A mounting assembly for mounting a ceiling fan assembly to a mount surface, the mounting assembly comprising:
- a plate configured to be mounted to the mount surface;
- a hanger bracket; and
- a set of elastomeric grommets coupling the plate to the hanger bracket;
- wherein each of the set of grommets comprises a cap and a bridge between at least two of the caps.

11. The mounting assembly of claim 10, wherein the plate further comprises a set of plate apertures that receive at least one of the set of elastomeric grommets.

12. The mounting assembly of claim 11, wherein the hanger bracket further comprises a set of bracket apertures that receive at least one of the set of elastomeric grommets.

13. The mounting assembly of claim 12, wherein the plate aperture is larger than the bracket aperture.

14. The mounting assembly of claim 13, wherein the plate aperture is oblong and the bracket aperture is circular.

15. The mounting assembly of claim 12, wherein each of the set of grommets have a stem with a width the same or smaller as the bracket aperture width.

16. The mounting assembly of claim 12, wherein the set of elastomeric grommets comprises two or more elastomeric grommets.

17. The mounting assembly of claim 10, wherein the set of elastomeric grommets comprises one or more of natural rubber, synthetic rubber, neoprene, polyisoprene, polybutadiene, silicone rubber, or a viscoelastic polymer.

* * * * *